March 7, 1950 — M. H. ALLDREDGE — 2,499,346
TIE ROD SOCKET ASSEMBLY
Filed March 4, 1944
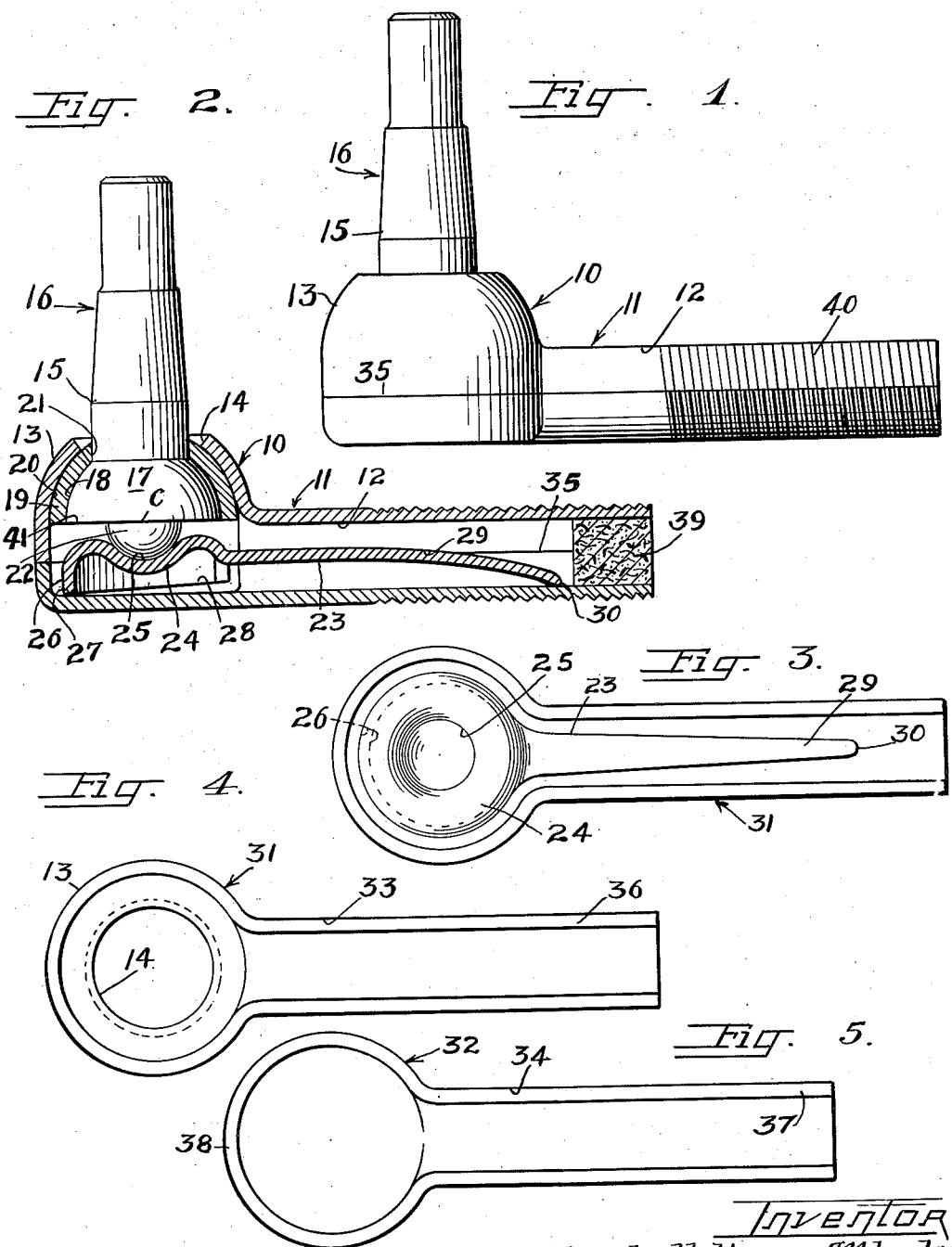
Inventor
Marshall Homer Alldredge.
by Charles W. Hills Attys.

Patented Mar. 7, 1950

2,499,346

UNITED STATES PATENT OFFICE 2,499,346

TIE ROD SOCKET ASSEMBLY

Marshall Homer Alldredge, Detroit, Mich., assignor to Thompson Products, Inc., a corporation of Ohio Application March 4, 1944, Serial No. 525,039

8 Claims. (Cl. 287—90)

This invention relates to a tie rod socket assembly and to a method of making the same.

In accordance with the present invention, a tie rod end housing is formed from a pair of metal stampings provided with longitudinally extending mating edges, which, after the ball stud, ball seat and spring have been inserted in place, are welded together to complete the assembly. The shank portion of the end housing is then threaded externally for engagement with the end of the tie rod proper. By virtue of this construction, the cost of producing tie rod end assemblies is greatly reduced over the cost of manufacturing tie rod end assemblies of the forged or stamped types heretofore in common use. In particular, the present construction permits the use of an elongated stamping to serve as the spring for urging the ball of the ball stud, the ball seat and the associated part of the housing into constant bearing relationship. Such a spring element can be more inexpensively manufactured than the usual coiled spring that is conventionally used for this purpose.

It is therefore an important object of this invention to provide a comparatively simple and inexpensive method of making and assembling tie rod ends, in accordance with which the tie rod end socket or housing is formed from complementary metal stampings the mating edges of which extend longitudinally of the shank of the housing, whereby an elongated stamped spring element can be employed in place of the conventional coiled spring for holding the ball, ball seat and conforming portion of the housing wall in proper bearing relationship.

It is a further important object of this invention to provide a tie rod end assembly formed of complementary metal stampings having mating edges extending longitudinally of the shank portion of the tie rod end and adapted to be welded together to complete the assembly, the shank portion then being threaded to provide threads for engagement with a threaded end of the tie rod proper.

Other and further important objects of the invention will become apparent from the disclosures in the specification and the accompanying drawings.

On the drawings:

Figure 1 is an elevational view of the completed tie rod end assembly embodying the principles of my invention.

Figure 2 is a longitudinal sectional view of the tie rod end assembly illustrated in Figure 1, with the ball stud in elevation.

Figure 3 is a top plan view of the lower stamping with the spring element in position, prior to assemblage of the two complementarily formed stampings comprising the tie rod end housing.

Figure 4 is a plan view of the upper stamping, and

Figure 5 is a plan view of the lower stamping.

The reference numeral 10 (Figs. 1 and 2) indicates generally a tie rod end assembly embodying the principles of my invention. Said tie rod end assembly includes a housing 11 having a cylindrical shank portion 12 and a segmental spherical portion 13 at one end of said shank portion. Said segmental spherical portion 13 is apertured, as at 14, to permit the extension therethrough of the shank 15 of a ball stud 16, the ball end 17 of which is positioned within said segmental spherical housing portion 13.

The ball end 17 of the ball stud 16 is provided with a segmental spherical surface 18, which constitutes the bearing surface of the stud during swivelling movement about its axis. A pair of bearing seats 19 is adapted to be positioned between said segmental spherical surface 18 and the inner segmental spherical wall 20 of the housing portion 13. Said bearing seats 19 extend at their upper ends into contact with the neck of the ball stud shank 15, as at 21 so that tilting movement of the stud 16 is accommodated through relative movement between the contacting surfaces of the seats 19 and segmental spherical socket portion 13. There is thus a separate pair of bearing surfaces for tilting movement of the stud 16 and a separate set of bearing surfaces for swivelling movement of said stud 16. The aperture 14 in the segmental spherical portion of the housing 13 is sufficiently large to provide the necessary amount of clearance as the ball stud 16 is tilted. Also, in accordance with my present invention, the center of tilting movement of said stud 16, which is indicated at C, is sufficiently high within the segmental spherical socket portion 13 to insure a sufficient area of bearing contact between the ball seats 19 and inner socket wall 20 throughout the full extent of the tilting action to which the stud 16 may be subjected in use.

The segmental ball portion 17 of the stud 16 is provided with a lower plane surface 41 from which projects a smaller segmental spherical seating portion 22. Said segmental spherical seating portion 22 is adapted to cooperate with a spring seat 23 of novel construction.

Said spring seat 23 may suitably be formed of relatively thin, resilient sheet metal, as by stamping, to provide a dished portion 24 having an upper wall 25 conforming in curvature with the segmental spherical seating portion 22 of the stud. A downwardly turned flange 26 partly surrounds said dished portion 24 and provides a point of contact, as at 27, with the lower inner wall of the housing 11. To insure substantially a single point of contact, such as the point 27, the lower edge 28 of said flange 26 is sloped upwardly away from said point 27. On the other side of the dished portion 24 from the point 27, the spring member 23 is provided with an elongated bowed extension 29, the end 30 of which is adapted to rest upon the inner wall of the shank portion 12 of the housing. The spring seat 23 thus rests against the wall of the housing at widely spaced points, such as points 27 and 30, whereby a considerable amount of spring action can be realized through the inherent resiliency of bowed portion 29. Said bowed portion 29 is tapered lengthwise (Fig. 3) so that its edges converge toward the extremity 30.

The tie rod end housing 11, in accordance with my present invention, is formed of complementary metal stampings, a stamping 31 constituting the upper portion of the housing and a stamping 32 constituting the lower portion of the housing. The stampings 31 and 32 are preferably, although not necessarily, so formed that the line of their mating surfaces 33 and 34, respectively, when assembled, lies in a median plane passing through the shank portion 12. This is best illustrated in Figures 1 and 2 by the parting line 35, which is also the line of weld as will later be described.

The upper stamping 31 is provided with a semi-cylindrical shank portion 36 and with a segmental spherical end portion that constitutes the portion 13 already described. The lower stamping 32 includes a segmental cylindrical shank portion 37 and a shallow segmental cylindrical portion 38 with its axis at right angles to the axis of the shank portion 37. Said shallow segmental cylindrical portion 38 mates with the lower cylindrical wall of the segmental spherical portion 13 of the upper stamping 31.

In assembling the tie rod end of my invention, the seats 19 are inserted inside the segmental spherical portion 13 of the upper stamping 31 and the shank 15 of the ball stud 16 passed through the aperture 14 to bring the ball portion 17 into contacting engagement with said seats 19. The spring seat 23 is then laid in the lower stamping 32 and the two stampings 31 and 32 brought into mating relationship with respect to their mating edges 33 and 34, respectively. This act of mating the two stampings places the spring seat 23 under load, so that the stamping sections must be temporarily held while being welded along the parting line 35. The welding is effected in any suitable manner, as by butt welding. After the welding is completed, grease may be introduced into the interior of the completed housing 11 to lubricate the joint. A plug 39 is then inserted in the open end of the shank portion 12 to prevent the grease from leaking out of the housing.

Prior to filling the housing with grease and inserting the plug 39, the shank portion 12 may be provided with external threads 40 for engagement with the usual threaded end of the tie rod proper (not shown). Two tie rod ends, similar to the tie rod end 10, will ordinarily be used with each tie rod, one at each end thereof.

It will be apparent from the foregoing description that I have made it possible by the provision of housing sections mated longitudinally of the shank portion of the tie rod end socket to use a spring seat of the novel construction shown. An elongated spring seat such as the stamping 23 could not ordinarily be used in a conventional type tie rod end since there would be no way of inserting the spring seat in place. However, with a construction as illustrated, it is a relatively simple matter to assemble the spring seat 23 within the housing and to weld the housing sections together with the spring in a preloaded condition. The amount of preloading may, of course, be varied to suit specifications. Once assembled, the spring seat 23 holds the ball end 17, ball seats 19 and inner wall of the segmental spherical housing portion 13 in proper bearing relationship during continued use of the tie rod end.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A ball joint housing comprising a pair of stampings having longitudinally extending mating edges welded together, one of said stampings only having a segmental spherical portion for receiving the ball end of a ball stud and being apertured for the passage therethrough of the shank of said stud.

2. A ball joint assembly comprising a pair of complementary stampings forming together a ball housing portion and a hollow shank portion, said stampings having mating edges extending longitudinally of said shank portion and being welded together, a ball end in said ball housing portion, and a spring partly in both of said portions and cooperating with said ball end to permit swivelling and tilting movement thereof.

3. A tie rod end assembly, comprising a pair of stampings welded together to form a housing having a segmental spherical portion and a hollow shank portion, a ball end mounted in said segmental spherical portion, a bowed spring element having a ball end engaging part and having extensions therefrom adapted to contact said housing at spaced points at the sides of said ball end engaging part to permit a flexing of said element.

4. A tie rod end assembly, comprising a pair of stampings welded together to form a housing having a segmental spherical portion and a hollow shank portion, the line of weld extending longitudinally of said shank portion, a ball end mounted in said segmental spherical portion, a bowed spring element having a ball end engaging part and having extensions therefrom adapted to contact said housing at spaced points at the sides of said ball end engaging part to permit a flexing of said element.

5. A tie rod end assembly, comprising a pair of complementary stampings forming a housing having a segmental spherical portion and a cylindrical shank portion, said stampings being formed together along mating surfaces extending longitudinally of said shank portion, a stud having a ball end in said segmental spherical portion, bearing seats for said ball end, and a spring urging said ball end, seats and segmental spherical portion into bearing relationship, said spring being bowed intermediate its ends and said ends being in contact with widely spaced points of said housing wall.

6. A tie rod end assembly, comprising a pair of complementary stampings forming a housing having a segmental spherical portion and a cylindrical shank portion, said stampings being formed together along mating surfaces extending longitudinally of said shank portion, a stud having a ball end in said segmental spherical portion, bearing seats for said ball end, and a spring urging said ball end, seats and segmental spherical portion into bearing relationship, said spring being a metal stamping having a dished ball end engaging portion, an adjacent flange for engaging a wall of the housing and an elongated bowed extension the end of which is adapted to contact the wall of said shank portion.

7. A tie rod end assembly comprising complementary stampings welded together to form a housing having a segmental spherical end and a cylindrical shank, a ball stud, the ball of said ball stud within said segmental spherical end, ball seats associated with said ball, and a spring urging said ball and seats into bearing relationship, said spring comprising a member having an intermediate dished portion for engaging said ball, a flange extending therefrom for contact with the wall of said housing on one side thereof and an elongated bowed extension for contact with the wall of said shank on the other side of said dished portion.

8. A tie rod end having a stud receiving portion and a shank for mounting on a tie rod, said tie rod end comprising mated stampings longitudinally secured together and threaded along their shank-forming portions to provide a hollow shank, said stud receiving portion being in open communication with said hollow shank whereby lubricant introduced into said shank serves to lubricate said stud receiving portion.

MARSHALL HOMER ALLDREDGE.

REFERENCES CITED

The following references are of record in the file of this patent:

UNITED STATES PATENTS

| Number | Name | Date |
| --- | --- | --- |
| 1,031,982 | Caswell | July 9, 1912 |
| 1,050,422 | Birchwood | July 14, 1913 |
| 1,429,705 | Williams | Sept. 19, 1922 |
| 1,671,675 | Hansen | May 29, 1928 |
| 1,867,540 | Rosenberg | July 12, 1932 |
| 1,913,459 | Skillman et al. | June 13, 1933 |
| 2,037,786 | Hufferd | Apr. 21, 1936 |
| 2,108,814 | Flumerfelt | Feb. 22, 1938 |
| 2,147,815 | Hufferd et al. | Feb. 21, 1939 |
| 2,157,401 | Craver | May 9, 1939 |
| 2,178,206 | Katcher | Oct. 31, 1939 |
| 2,208,325 | Krutsch | July 16, 1940 |
| 2,216,338 | Busse | Oct. 1, 1940 |